Nov. 29, 1949     J. WIDMER-STEINER     2,489,552
SHOCKPROOF WATCH BEARING RETAINER
Filed May 7, 1946
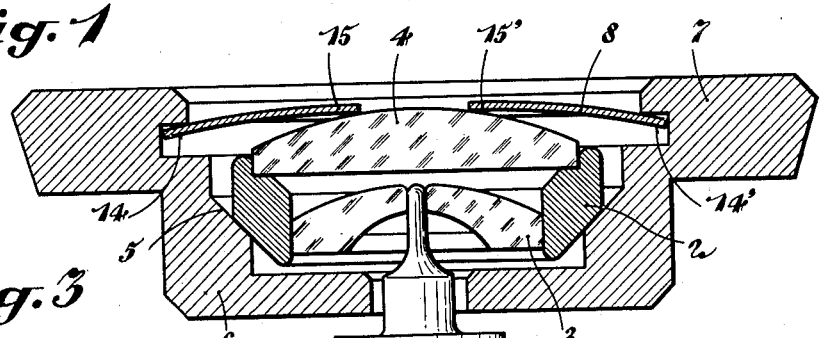
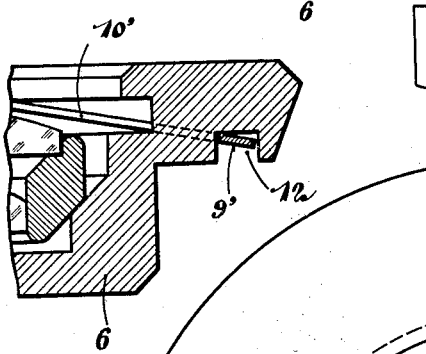
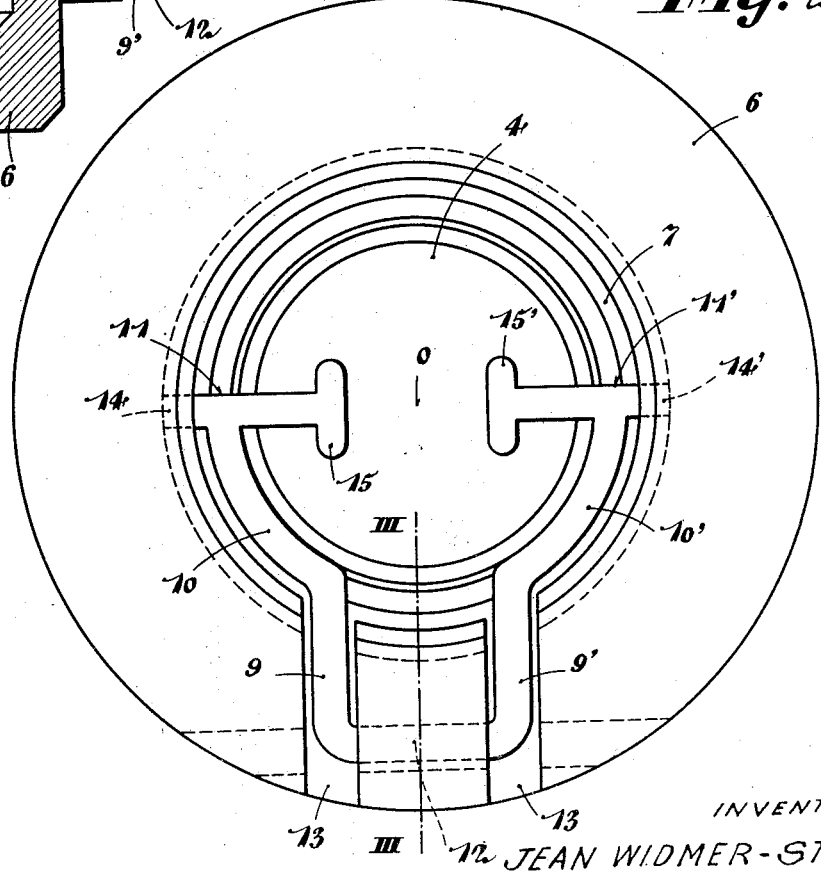

Patented Nov. 29, 1949

2,489,552

UNITED STATES PATENT OFFICE 2,489,552

SHOCKPROOF WATCH BEARING RETAINER

Jean Widmer-Steiner, Granges, Switzerland

Application May 7, 1946, Serial No. 667,942
In Switzerland May 2, 1945

2 Claims. (Cl. 58—140)

This invention relates to resilient retainers for watch bearings and more particularly for the cap jewels of bearings for the balance staffs of watches and has for its object to provide a new and useful resilient retainer which will be efficient in action and simple in construction.

The accompanying drawing shows, by way of example, a shockproof balance staff bearing embodying the invention.

Fig. 1 is a section along the axis of the balance staff.

Fig. 2 is a plan view.

Fig. 3 is a cross sectional view on line III—III of Fig. 2.

1 designates the balance staff. 2 is a movable bush carrying a pierced jewel 3 and a counter-pivot jewel 4, this assembly forming the bearing of the pivot 1. The bush 2 rests loosely on a conical or a rounded surface 5 provided on an annular member 6 forming the body of the bearing. The upper part of said member 6 forms a ring 7 serving to hold a spring 8 bearing against the outer face of the counter-pivot jewel 4.

The spring 8 is a flat spring having the general shape of a U. Each arm 9 and 9' of this U terminates in an arcuate portion 10 and 10', these portions having a common centre coinciding with the centre O of the counter-pivot jewel, through which centre the axis of symmetry of the U also passes. The arcuate portions 10 and 10' are each extended by a transverse portion 11, 11'. These two transverse portions 11 and 11' are in mutual alignment and are located on the diameter of the jewel 4 which is at right angles to the axis of symmetry of the U. Each transverse portion extends on one side of the arcuate portion.

The spring 8 is hingedly connected to the member 6 forming a support, by means of its medial transverse portion 12 connecting the arms 9 and 9'. For this purpose, the bearing support 6 is provided with two grooves 13 and 13' which are parallel and symmetrical to a diameter and which allow the said medial portion 12 to be inserted in a recess of the part 6 in which it can pivot.

On the other hand, the spring is removably fixed to the part 6 at two diametrically opposite points by the ends 14 and 14' of the transverse portions 11 and 11' extending outwardly from the arcuate arms 10, 10' of the U being inserted under the ring 7, whereas the spring bears against the jewel 4 by means of the enlarged ends 15 and 15' of the transverse portions 11 and 11' extending inwardly from the arcuate arms 10, 10' of the U.

When it is required to take the bearing apart, it is necessary first of all to disengage the spring 8. For this purpose it is only necessary to press the parts 15 and 15' towards one another with a spike or with pincers and disengage the parts 14 and 14' from under the ring 7. It is then possible to swing the spring about its part 12 in order to disengage it from the parts of the bearing. The spring can be replaced in position by effecting the reverse operations.

The advantages offered by the device illustrated and described herein are as follows:

Owing to the special shape of the spring 8, the drilled jewel 3 and the counter-pivot jewel 4 may be of very large diameter, which allows of perfect lubrication.

The spring bears against the cap jewel 4 by means of the two free ends 15 and 15', thereby ensuring considerable resilience.

The construction of the bearing is very simple, since the holding of the spring only requires the two grooves 13.

Furthermore, the bush 2 shown, which holds the cap jewel loosely, facilitates the cleaning of the bearing. Said bush being partly cylindrical does not escape from the pincers during cleaning.

For lubrication, it is only necessary to remove the bush and the counter-pivot jewel from the bearing, then lubricate like an ordinary part and replace the bush in position in the bearing; said bush after oiling adheres to the counter-pivot jewel and can thus be replaced in position without difficulty. The fact that the jewels are of large diameter enables a large drop of oil to be placed on them which, when a shock occurs, prevents any tendency to spread and the oil can retain its absolute viscosity for a very long time, thereby ensuring the adjustment of the watch.

The spring, which is pressed at 14 and 14', acts with a bending stress from 15 and 15' on the overhanging arm; on the other hand, owing to its shape, an additional bending occurs by torsion between 15 and 15' and between 15/15' through 14 up to 12, thereby permitting of the most judicious distribution of the strength relatively to the cross-section with a maximum strength at the points of action for a minimum bulk and cross-sectional area.

I claim:

1. A shockproof watch bearing retainer comprising in combination with an annular bearing body, a bush movably supported therein, a cap jewel loosely carried by said bush, a generally U- shaped flat spring having straight arms each terminating in an arcuate portion, said arcuate portions being concentric with respect to said cap jewel and provided with a transverse extension, said two transverse extensions being in mutual alignment on both sides of said arcuate portions along a diameter of said cap jewel which is perpendicular to the axis of symmetry of said U-shaped spring, said spring being hingedly connected with said annular bearing body by the transverse medial bar connecting its arms, and means for removably securing said spring to said bearing body by the ends of said transverse extensions, the inner ends of said transverse extensions resiliently bearing against the cap jewel.

2. A shockproof watch bearing retainer as claimed in claim 1 wherein the annular bearing body is formed with two parallel grooves to receive the straight arm portions of the U-shaped spring and with a transverse recess connecting said grooves to receive the hinged transverse medial bar of said spring.

JEAN WIDMER-STEINER.

REFERENCES CITED

The following references are of record in the file of this patent:

UNITED STATES PATENTS

| Number | Name | Date |
|---|---|---|
| 2,233,743 | Marti | Mar. 4, 1941 |

FOREIGN PATENTS

| Number | Country | Date |
|---|---|---|
| 183,386 | Switzerland | July 1, 1936 |
| 208,022 | Switzerland | Mar. 16, 1940 |